United States Patent [19]

Greenberg

[11] Patent Number: 4,957,306
[45] Date of Patent: Sep. 18, 1990

[54] LEAF WAGON

[76] Inventor: George Greenberg, 367 Orchard Beach, Mastic Beach, N.Y. 11951

[21] Appl. No.: 369,641

[22] Filed: Jun. 21, 1989

Related U.S. Application Data

[63] Continuation-in-part of Ser. No. 297,216, Jan. 17, 1989.

[51] Int. Cl.⁵ .............................................. B62B 1/20
[52] U.S. Cl. ................................ 280/652; 280/47.24; 280/47.26; 280/47.33
[58] Field of Search ............... 280/639, 652, 653, 654, 280/47.17, 47.18, 47.24, 47.26, 47.33

[56] References Cited

U.S. PATENT DOCUMENTS

| 609,129 | 8/1878 | Twist | 280/47.24 |
|---|---|---|---|
| 1,955,997 | 4/1934 | Yant | 37/130 |
| 2,891,332 | 6/1959 | Kalian | 280/47.26 |
| 2,895,238 | 7/1959 | Long | 280/47.26 |
| 2,992,011 | 7/1961 | Belan | 280/47.26 |
| 3,106,303 | 10/1963 | Finocchiaro | 280/47.26 |
| 3,552,760 | 8/1968 | Sine | 280/47.31 |
| 3,774,930 | 11/1973 | Pravednekow | 280/47.24 |
| 4,240,353 | 12/1980 | Barth | 280/47.24 |
| 4,350,356 | 9/1982 | Crothers | 280/47.26 |
| 4,375,113 | 3/1983 | Ewert | 280/47.24 |
| 4,735,424 | 4/1988 | Steller, III | 280/47.24 |
| 4,826,187 | 5/1989 | Abbott et al. | 280/47.33 |

*Primary Examiner*—Charles A. Marmor
*Assistant Examiner*—Richard Camby
*Attorney, Agent, or Firm*—Leonard Belkin

[57] ABSTRACT

A leaf carrying cart having a pair of rectangular frames supporting a pair of baskets hinged at the top to permit the forward basket to rotate between a first position where the two baskets are extended and a second position with one basket folded on top of the other. One of the baskets is provided with an opening for the discharge of contents of the cart and a rotating cover to either open or close the opening.

4 Claims, 5 Drawing Sheets

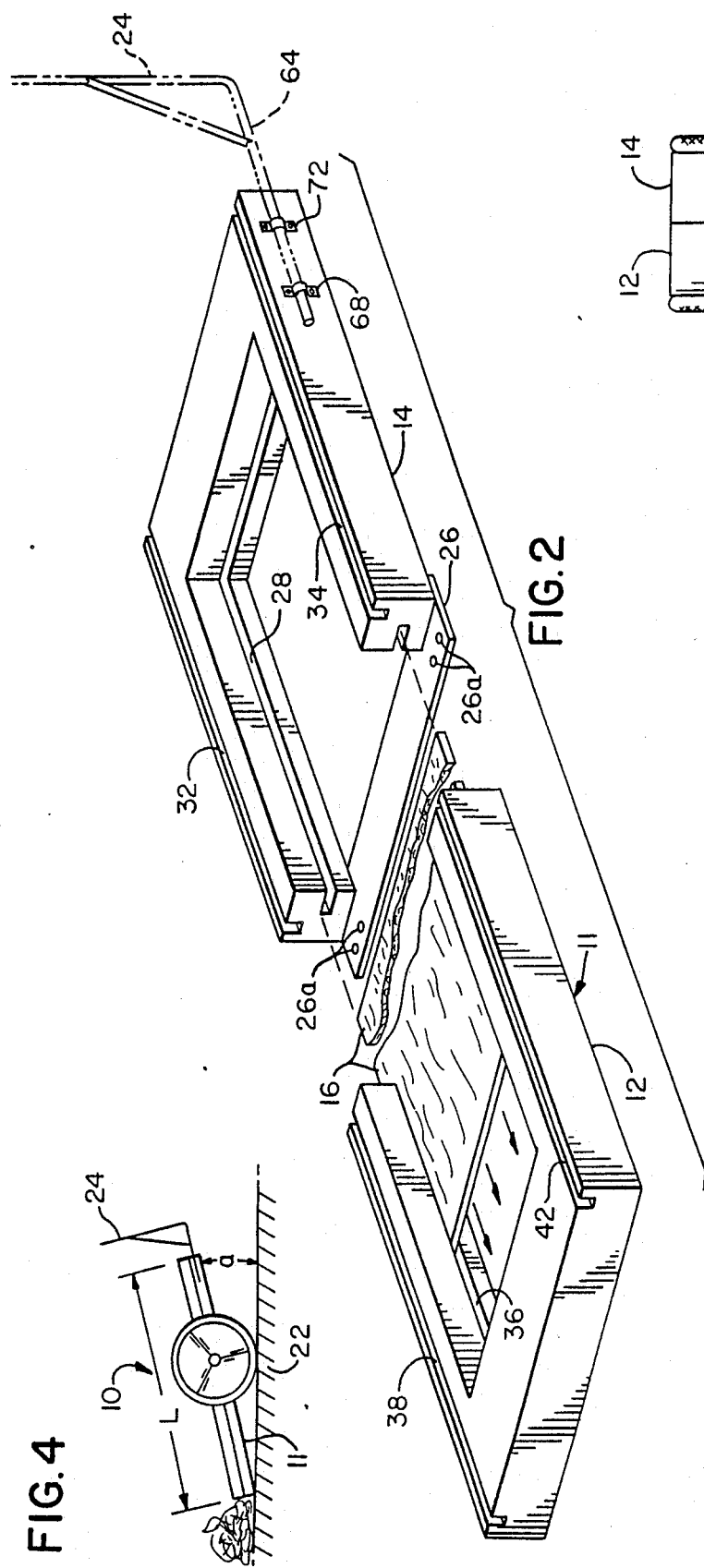
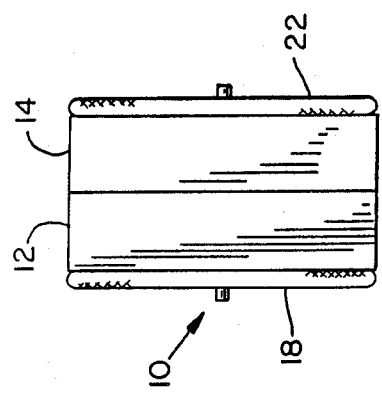
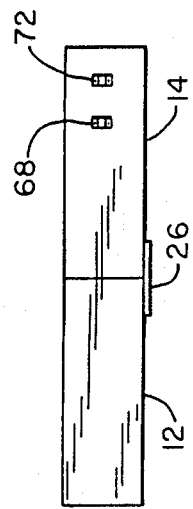
FIG. 2
FIG. 2a
FIG. 4
FIG. 6

FIG.10
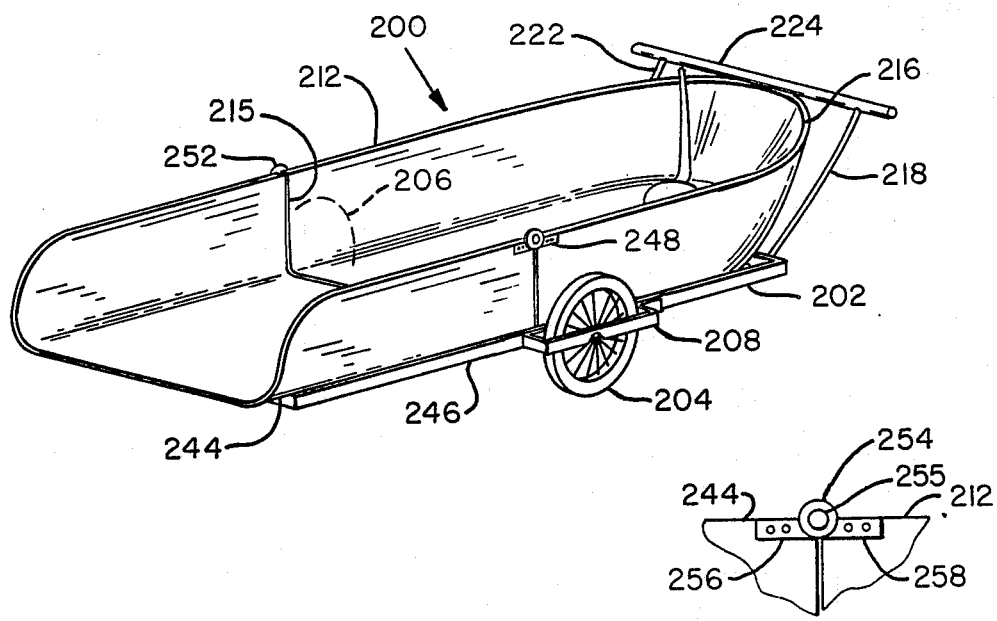
FIG.10a
FIG.12
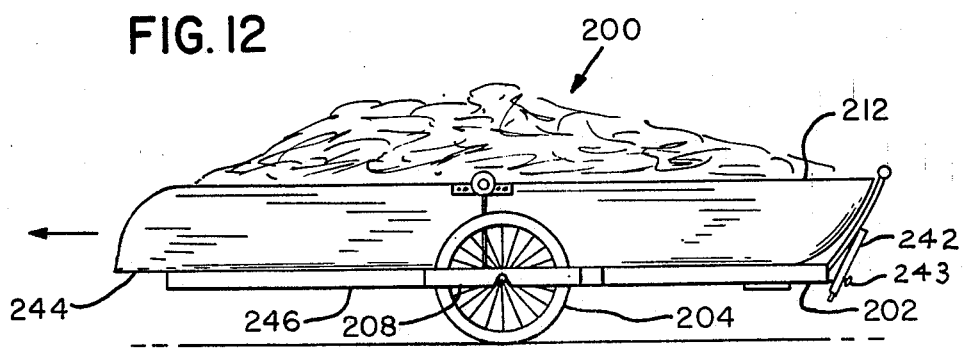
FIG.11
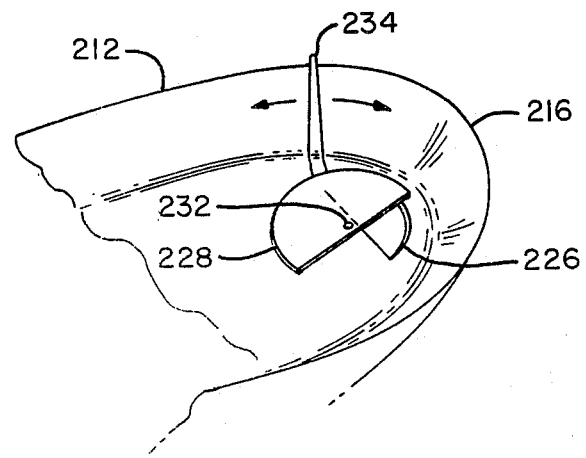

LEAF WAGON

This application is a continuation-in-part of my application Ser. No. 07/297,216 filed on Jan. 17, 1989.

The present invention relates to hand carts and more particularly to hand carts especially useful for the gathering and removal of leaves.

At the present time the wheelbarrow appears to be most generally used cart for the collection and carting away of leaves. When such a device is utilized the leaves must be lifted into the cart which ordinarily lacks sufficient capacity to carry many leaves at one time. A wheelbarrow with sufficient capacity to carry a lot of leaves at one time tends to be very large and heavy. In addition, the wheelbarrow is not suited for riding over rough terrain.

Another problem is the manufacture, assembly and shipping of hand carts. Even the wheelbarrow when disassembled for delivery and assembly by the consumer for use, is quite often a bulky device.

A variety of hand carts are shown in U.S. Pat. Nos. 1,955,997, 3,774,930, 4,240,353, 4,375,113 and 4,735,424. None of the preceding patents teaches or suggests the present invention.

It is not difficult to design hand carts, sleds and other carrying devices to satisfy many different requirements. However, in a modern economy the cost of storage of merchandise as well as the cost of labor of assembling the components is prohibitively expensive so that it is no longer economical to assemble, package and store hand carts in stores or warehouses. Instead, considerations of economy require bulky items, such as hand carts to be constructed in a way that allows them to be packaged and stored in compact boxes and to be assembled with a minimum use of tools.

SUMMARY OF THE PRESENT INVENTION

In the present invention there is provided a hand cart uniquely useful for the collection and carting away of leaves.

A preferred embodiment of this invention has the capacity to carry much larger volumes of leaves normally found in wheelbarrows or other devices of similar type. In addition, it can be tipped at an angle sufficiently shallow so that the leaves can be raked onto its carrying platform rather than being lifted. Furthermore, the wheel construction permits convenient movement over rough terrain and the use of conventional bicycle wheels of thin axle construction so that the cart incorporating the principles of this invention is relatively light in weight. A further feature of this invention is that in its knock down form prior to assembly in the form it is shipped it requires far less space and is lighter in weight than any similar devices available.

In another embodiment of this invention, the cart can be folded for convenient storage and has provision for removal and bagging of the leaves without anymore than minimal handling of the cart itself.

It is thus a principal object of this invention to provide an improved hand cart for use in collecting and carting away leaves.

This and other objects of this invention will become better understood in the light of the accompanying detailed description of a preferred embodiment of this invention.

BRIEF DESCRIPTION OF THE DRAWINGS

FIG. 2 is an exploded isometric view of the end frames and the base of the hand cart shown in FIG. 1.

FIG. 2a is a side elevation view of the end frames assembled of the cart shown in FIGS. 1 and 2.

FIG. 4 is partially schematic elevation view of the cart in its loading position.

FIG. 6 is a side elevation view of the cart assembled for shipment and sale, prior to assembly.

FIG. 10 is an isometric view of another alternative embodiment of this invention.

FIG. 10a is a detail of the hinge shown in FIG. 10.

FIG. 11 is a detail looking down on the rear end of the cart.

FIG. 12 is a side elevation view of the cart shown in FIG. 10.

DETAILED DESCRIPTION OF THE PREFERRED EMBODIMENT

Figure 1:
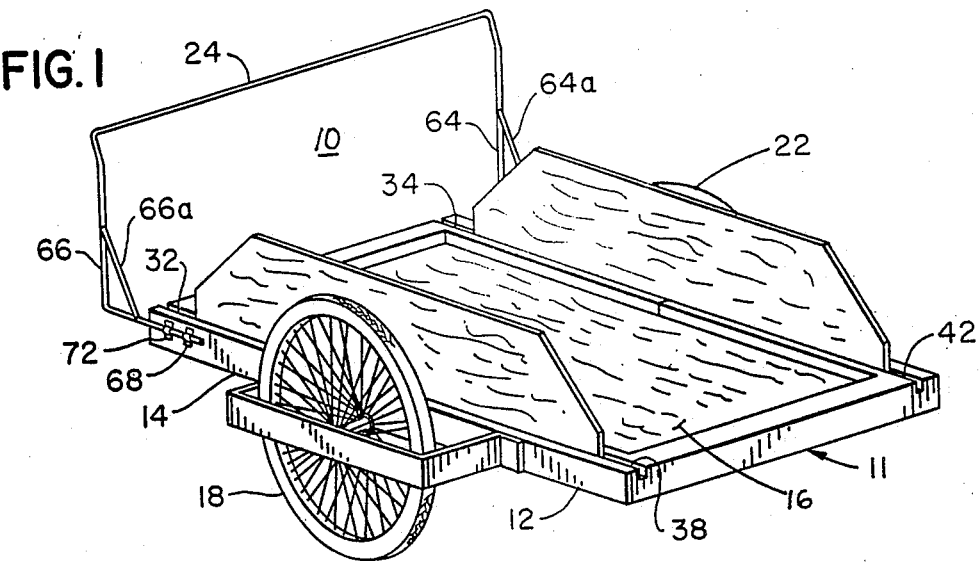
FIG. 1 is a perspective view of a hand cart constructed according to the principles of this invention including a schematic illustration of a wheel support bracket.

Referring now to FIG. 1, cart 10 is composed of a frame 11 made of frame members 12 and 14 supporting a bed 16, a pair of wheels 18 and 22, and a handle 24.

For details of frame members 12 and 14 with bed 16, reference is made to FIG. 2. Members 12 and 14 are identical with each other except that one of the members, in this case member 14, is provided with a supporting plate 26 whose purpose will be explained below.

Member 14 is U-shaped in construction with an internal U-shaped groove 28 and a pair of grooves 32 and 34 along the top surfaces of the parallel arms of member 14.

Member 12 is similarly provided with an internal groove 36 and parallel grooves 38 and 42.

Bed 16 is a flat sheet of plywood in a standard stock size, namely, four feet by eight feet, and members 12 and 14 are sized and constructed to accommodate bed 16 in the manner now to be described.

As seen from FIG. 2, bed 16 is slid into member 12 riding in groove 36 and then member 14 is engaged with bed 16 until members 14 and 16 come together with their legs abutting each other as seen in FIG. 2a. Plate 26 is seen to overlap the underside of both members where they come together and may be screwed into attachment as shown by openings 26a to accommodate screws (not shown).

Once members 12 and 14 are assembled with bed 16 in place, wheels 18 and 22 are mounted.

Figure 3:
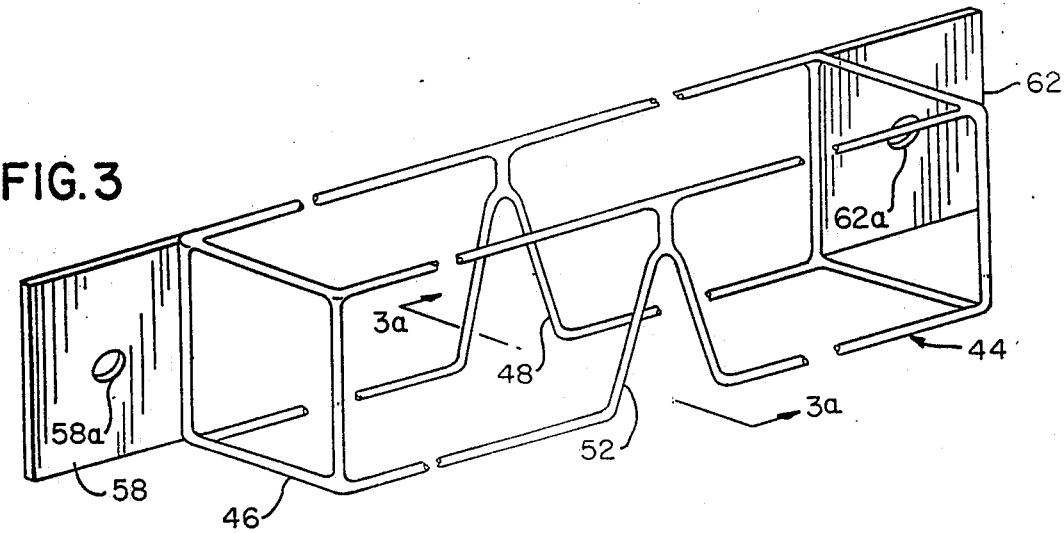
FIG. 3 is an isometric view showing the details of a wheel support bracket.

Wheel 18 is supported by a wheel support bracket 44 whose details are seen in FIG. 3. It should be noted that wheel 22 is similarly supported on the other side of cart 10 shown in FIG. 1 except that its wheel mounting frame is not visible.

Figure 3A:
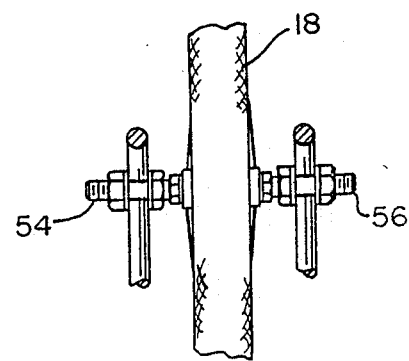
FIG. 3a is a view along 3a–3a of FIG. 3 with the wheel in place.

Bracket 44 is a made of a hollow elongated box 46 of wire or similar truss-like construction supporting a pair of inverted V-shaped slots 48 and 52 to accommodate the axles 54 and 56 seen in FIG. 3a of wheel 18. This wheel support is conventional for bicycles but unique in this particular application. It is thus simple and quick to mount and demount the wheels of cart 10.

Bracket 44 is provided with a pair of mounting plates 58 and 62 so that frame 44 can be attached to one side of cart 10 as illustrated in FIG. 1. Plates 58 and 62 are provided with screw holes 58a and 62a, respectively, for this purpose.

Handle 24 is made of piping or round wire and is provided with arms 64 and 66 with braces 64a and 66a to slide into brackets 68 and 72 (as seen in phantom in FIG. 2) on one side of member 14. Handle 24 may be made removable if desired to be moved to the other side of cart 10, for which additional brackets on member 12 would be provided. Also, handle 24 may be made of pieces which can be assembled. It will also be noted that handle 24 is U-shaped with L-shaped bottoms to form arms 64 and 66 at about right angles to the upright arms so that the leaves can be loaded onto or off loaded from cart 10 from either end as will be described below with handle 24 not interfering with the movement of the leaves.

One of the features of this invention is that the leaves can be loaded on cart 10 by raking rather than lifting. As seen in FIG. 4, the length L of frame 11 is sufficiently large in relation to the size or diameter of wheels 18 and 22 that when one end is lowered to collect leaves, the angle a made by frame 11 with respect to the ground is sufficiently small so that substantially all leaves raked aboard will remain and not slide off.

Another feature of this invention is that wheels 18 and 22 may be standard bicycle wheels, sufficiently large to ride over bumps, obstacles, and ruts with minimal effort on the part of the user of cart 10.

Still another feature of the invention is the use of the side wheel supporting brackets as described which in effect form trusses to support very short shafts. This makes it possible to employ relatively thin and lightweight wheels with thin, short axles so as to keep the weight of cart 10 down to convenient and manageable proportions while at the same time being able to handle very large amounts of leaves at any one time.

Figure 5:
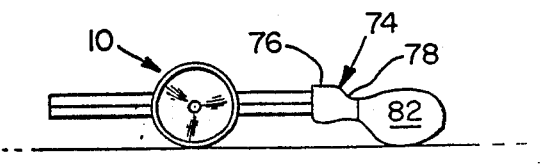
FIG. 5 is a partially schematic elevation view of the cart with a snout to facilitate transferring the leaves to a bag.

In order to facilitate the unloading of the leaves in cart 10 into a plastic bag, as seen in FIG. 5, a plastic funnel shaped snout 74 having a wide mouth 76 which goes over the end of cart 10, and a smaller section 78 over which the opening into plastic bag 82 is placed. The leaves are merely raked into bag 82 for disposal.

As pointed out earlier, the size of the frames 12 and 14 when connected together could be made to accommodate a standard plywood type base of the size which is 4 by 8 feet. With this arrangement, a merchant could store cart 10 in comparatively small packages, as seen in FIG. 6, without the base 16 and the seller would have the advantage of being able to sell the cart at a lower cost because the base 16 would have to be purchased separately or the consumer may already have one available at home.

Figure 7:
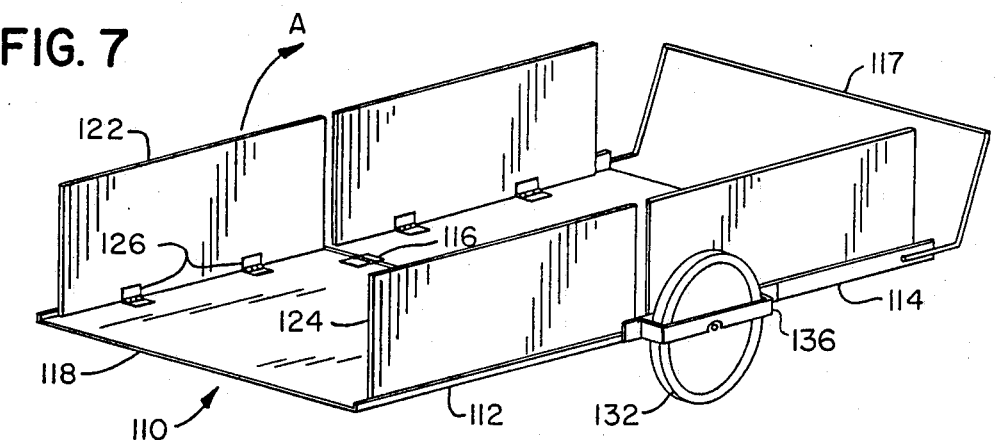
FIG. 7 is an isometric, illustrative view of an alternative embodiment of this invention.
Figure 8:
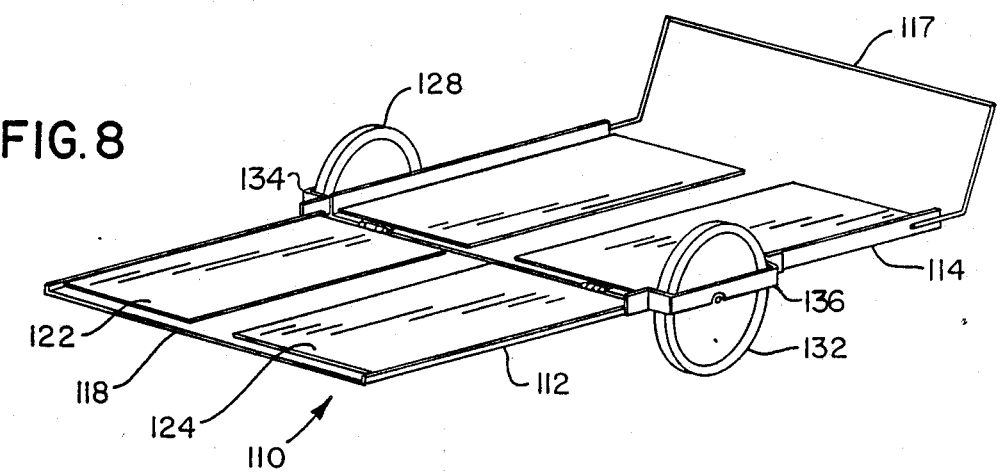
FIG. 8 is an isometric view of the cart shown in FIG. 7 partially folded up.
Figure 9:
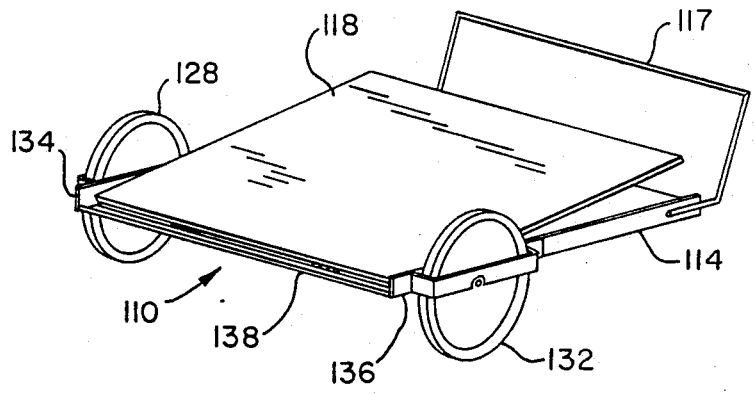
FIG. 9 is an isometric view of the cart shown in FIG. 7 folded up for storage.

In another embodiment of this invention, shown in FIGS. 7, 8 and 9, there is shown a cart 110 made of two parts, 112 and 114, with hinges 116 to be folded in the manner indicated by arrow A, and having a handle 117.

Part 112 consists of a bed 118 and a pair of side walls 122 and 124 hinged to fold inwardly as seen in FIG. 8. Hinges 126 are shown for side wall 122 in FIG. 7. Part 114 is of similar construction.

For supporting wheels 128 and 132 there are provided a pair of frames 134 and 136, similar to frame 44 in the embodiment of FIGS. 1–6, attached to part 114 so that part 112 can be pivoted as shown in FIG. 9. A member 138 joining frame 134 and 136 provides a support for part 112 when in the fully open position shown in FIG. 7.

In the embodiment of FIGS. 7–9, cart 110 may be all wood or metal in construction. When folded up as shown in FIG. 9, handle 117 and wheels 128 and 132 may be removed for shipment and/or storage. In any event, once folded, it is a compact unit which can be deployed for use quickly and conveniently.

For example, in the arrangement of FIGS. 7–9 just described, the side walls fold down and the bed is hinged for folding over. If desired, the side walls may be fixed, and the adjacent corners of the side walls above where the bed folds may be provided with hinges.

In addition, the two parts of the bed may be made to telescope rather than fold.

Under some circumstances, it is helpful to have a leaf wagon with greater capacity and capable of being folded up readily for storage, requiring less assembly when it is to be used.

Such an embodiment is illustrated in FIGS. 10–15. Leaf wagon 200 consists of a rectangular rear frame 202 supporting a pair of wheels 204 and 206 in frame 208 for the former, the frame for wheel 206 not being visible. Wheel 204 in frame 208 and wheel 206 in the hidden frame are identical in construction to wheel support bracket 44 and wheel 18 shown in FIGS. 1 and 3.

Resting in and supported by frame 202 is a bathtub shaped basket 212 cut off at 215 as illustrated. Basket 212 has a rear wall 216. A pair of arms 218 and 222 extend from frame 202 and support a handle bar 224.

Figure 14:
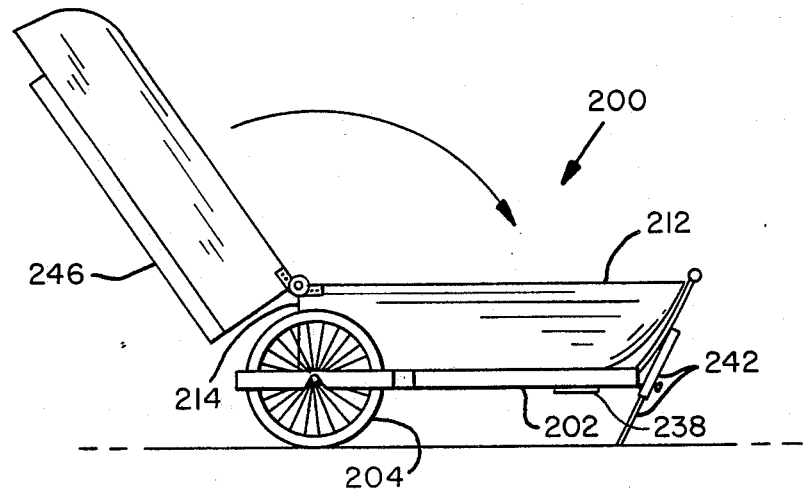
FIG. 14 shows the cart of FIGS. 10–13 being folded for storage.
Figure 15:
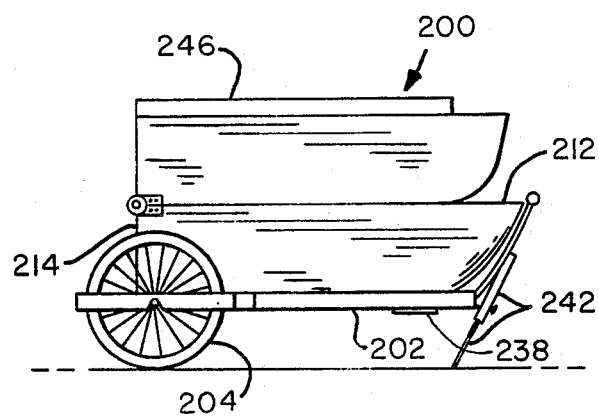
FIG. 15 shows the cart completely folded ready for storage.

Wheel frame 208 extends forward of basket 212 as more clearly shown in FIGS. 14 and 15 in order to provide better balancing of leaf wagon 200 when in the extended position shown in FIGS. 10 and 12. The frame for wheel 206 is directly opposite frame 208 and extends forward of basket 212 in a similar manner.

As seen in FIG. 11, the bottom of basket 212 adjacent rear wall 216 has an opening 226 with a cover 228 pivoted about a pin 232 and a handle 234 to move cover 228. By rotating handle 234 counter clockwise, opening 226 is exposed to permit emptying of the contents of wagon 10 into a bag 236 shown in FIG. 13; by rotating handle 234 clockwise, opening 226 would be closed off. Around the bottom of opening 226 may be provided a lip 238 to support bag 236.

On the outside of rear wall 216 may be provided an extensible member 242 to act as a third leg when extended to support wagon or cart 10 as seen in FIGS. 14 and 15. A lock member 243 may be employed to lock member 242 in place.

The front of wagon or cart 200 is provided with a V-shaped basket 244 supported on a rectangular frame 246, the cross section of basket 244 representing a continuation of the cross section of basket 212, as illustrated. Basket 244 and basket 212 are connected through a pair of hinges 248 and 252 so that basket 244 may be pivoted clockwise as seen in FIGS. 14 and 15 to permit more convenient storage of wagon or cart 200 when not in use.

As seen in FIG. 10a, hinge 248 which is identical to hinge 252 consists of a shaft 255 inside of a sleeve 254 to which wing or extension 258 is attached and would rotate. Wing 256 is attached to a sleeve (not shown) located beyond sleeve 254 also to rotate about shaft 255. Extensions 256 and 258 may be bolted on as shown.

Figure 13:
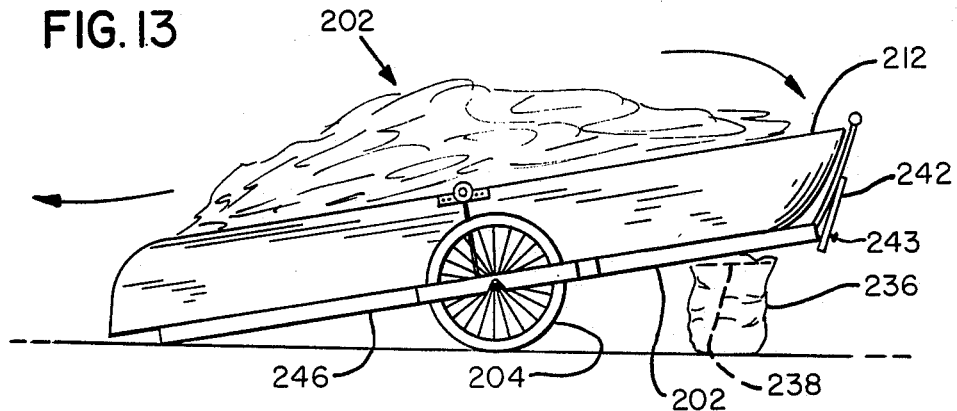
FIG. 13 is a side elevation view of the cart shown in FIG. 12 in position for loading a bag

In the open position, shown in FIGS. 10, 12 and 13, frames 246 and 202 come together to prevent member 244 from dropping below the position shown in FIG. 12.

It will be seen that the embodiment illustrated in FIGS. 10-15 is a convenient wagon or cart capable of carrying a substantial load, is easy to unload, and convenient to store.

While only certain preferred embodiments of this invention have been described it is understood that many variations of this invention are possible without departing from the principles of this invention.

What is claimed is:

1. A cart for carrying leaves comprising:
   a. a first flat rectangular frame supporting a first basket with a flat bottom open at one end, enclosed by two side walls and a a rear wall;
   b. a second flat rectangular frame supporting a second basket with a flat bottom having two side walls and open at both ends having a cross section identical to that of said first basket;
   c. hinge means attaching the exposed edges of the side walls at the top so that said second basket is rotatable between a first position wherein both said baskets are aligned forming said cart with the two flat bottoms arranged to form a continuous flat bottom surface in an open position and a second position wherein said second basket is resting upside down on said first basket, the side walls of both said baskets retaining their shape when said cart is folded;
   d. means mounted on opposite sides of said first frame supporting a pair of wheels;
   e. handle means extending from said first frame; and
   f. leg means extending from the rear wall of said first basket to provide additional ground support for said cart.

2. A cart for carrying leaves comprising:
   a. a first flat rectangular frame supporting a first basket open at one end, enclosed by two side walls and a rear wall, said first basket being provided with opening means on the bottom thereof for discharge of the contents of said cart, said opening means including a rotatable cover with a handle to open or close said opening.
   b. a second flat rectangular frame supporting a second basket having two side walls and open at both ends having a cross section identical to that of said first basket;
   c. hinge means attaching the exposed edges of the side walls at the top so that said second basket is rotatable between a first positions wherein both said baskets are aligned forming said cart in an open position and a second position wherein said second basket is resting upside down on said first basket;
   d. means mounted on opposite sides of said first frame supporting a pair of wheels;
   e. handle means extending from said first frame;
   f. leg means extending from the rear wall of said first basket to provide additional ground support for said cart and including an extensible member for retraction when said leg means is not in use;
   g. said first and second frames coming together to support said baskets in the open position of said cart; and
   h. said wheel supporting means comprising a truss-like structure which is box-like in configuration with a pair of inverted V-shaped receptacles to accommodate the axle on opposite sides of each said wheel for convenient mounting and demounting of said wheel.

3. The cart of claim 2 wherein said hinge means includes extensions attached to the side walls of said baskets and a shaft between said extension about which said baskets rotate relative to each other.

4. The cart of claim 3 wherein said truss-like structure extends forward of said first basket for providing better balancing of said cart.

* * * * *